Patented Feb. 18, 1947

2,416,263

UNITED STATES PATENT OFFICE 2,416,263

PENTAHALOPHENOXYALKANOLS

Clinton W. MacMullen, Syracuse, N. Y., assignor to Röhm & Haas Company, Philadelphia, Pa., a corporation of Delaware No Drawing. Application March 18, 1944, Serial No. 527,151

6 Claims. (Cl. 260—613)

This invention relates to chemical compounds of the formula

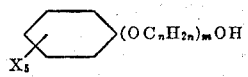

wherein X represents the halogens, chlorine and/or bromine, $n$ represents an integer from two to three, inclusive, and $m$ represents an integer from one to three, inclusive.

Although phenoxyethanol, phenoxypolyethoxyethanols, and hydrocarbon substituted derivatives thereof have been previously prepared, these compounds are quite different in their properties from the pentahalogenated compounds now disclosed. The latter possess unique properties, particularly in regard to the mildew-proofing of textile fibers, for which the previously known alkanols are not of value.

The products of this invention may be prepared in a number of ways, the most convenient being based upon the reaction of a pentahalophenol with an alkylene oxide or the reaction of a pentahalophenol with a halohydrin.

According to the former reaction, pentachlorophenol, pentabromophenol, or a pentahalophenol having both chloro- and bromo-substituents is reacted with ethylene oxide or propylene oxide under pressure at a temperature from 50° C. to about 250° C. By this method, one or more —OC$_2$H$_4$— or —OC$_3$H$_6$— groups may be introduced and usually a mixture of halophenoxyalkylene alcohols is produced. This mixture may be fractionated, if desired, or it may be used as such.

The products of this invention are also conveniently prepared by the reaction of a pentahalophenol with a halohydrin, such as ethylene chlorohydrin or bromohydrin, or other alkylene chlorohydrins, bromohydrins, or iodohydrins, including propylene chlorohydrin, or alkylene halohydrins in which the alkylene group is interrupted once or several times by oxygen. This reaction is carried out in the presence of an alkaline agent or with the alkali salt of the pentahalophenol. The reaction may, if desired, be carried out in the presence of an organic solvent, such as butanol, ethyl alcohol, acetone, toluene, at 50°–150° C., or in the presence of water as a solvent or suspending medium. On the other hand, the reaction is readily conducted by direct mixing of reactants.

The following examples give details of the preparation of typical pentahalophenyl ether alcohols of this invention.

Example 1

A mixture of 576 parts by weight of sodium pentachlorophenate, 1000 parts of water, 16 parts of sodium hydroxide, and 240 parts of ethylene chlorohydrin was stirred and heated under reflux for an hour. The reaction mixture was then extracted with toluene. The toluene solution was permitted to form an upper layer which was then separated from the aqueous portion. The toluene solution was then washed with dilute sodium hydroxide solution and with water. The toluene was stripped therefrom by distillation and the reaction product obtained therefrom was distilled under reduced pressure. The product boiled at 176°–182° C. at 4 mm. pressure. It solidified and was recrystallized from benzene and petroleum naphtha. The crystals obtained were colorless and melted at 92°–94° C. The compound was identified as

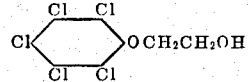

The above procedure applied to a corresponding molecular proportion of the bromophenate produces the corresponding pentabromophenoxyethanol.

Example 2

A mixture of 576 parts of sodium pentachlorophenate, 500 parts of ethyl alcohol, 40 parts of sodium hydroxide, and 284 parts of trimethylene chlorohydrin was stirred and heated under reflux at about 85° C. for seven hours. The reaction mixture was filtered while hot. The solvent was driven off, leaving a residual oil, which was taken up in toluene. The toluene solution of the reaction product was washed with water and heated in a distilling vessel. After the toluene was taken off, the product boiled at 175°–190° C. at one millimeter pressure. The distillate solidified. It was recrystallized from naphtha and yielded white crystals having a melting point of 72°–73° C. The product was

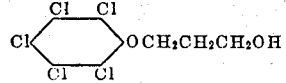

Example 3

A mixture of 576 parts of sodium pentachlorophenate, 500 parts of ethyl alcohol, 60 parts of sodium hydroxide, and 284 parts of 1-chloropropanol-2 was stirred and heated under reflux for four hours. The alcohol was then distilled off, leaving a residual oil, which was washed with water and distilled at 154°–187° C. under 2 mm. pressure. The distillate crystallized on cooling. It was recrystallized from petroleum ether, yielding colorless crystals melting at 57°–63° C. and having the composition:

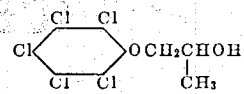

*Example 4*

Into an autoclave charged with 533 parts of pentachlorophenol there was passed 220 parts of ethylene oxide. This mixture was stirred and heated at 60° to 142° C. at 30 to 110 pounds pressure over a period of seven hours. The resulting product was fractionated. Some pentachlorophenoxyethanol was obtained, followed by pentachlorophenoxyethoxyethanol, pentachlorophenoxyethoxyethoxyethanol, and ethanols having additional oxyethyl groups. One fraction contained primarily the compound

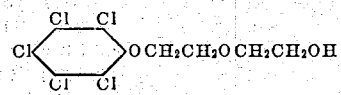

and boiled at 170°–195° C. at 2 mm. pressure. At room temperature it was a solid.

By methods generally similar to the above, there may be prepared any of the pentachloro- or pentabromophenoxy alkanols. The alkylene group may be interrupted by oxygen to form additional alkoxy groups. The alkylene group may be straight or branched.

These compounds are characterized by their surprising effectiveness as mildewproofing agents. They may be dispersed in an aqueous bath with dispersing agents such as sulfonated and formaldehyde-condensed naphthalenes, sodium dodecyl sulfate, cetyl dimethyl benzyl ammonium chloride, stearyl oxymethyl dimethyl pyridinium chloride, diisobutylphenoxypolyethoxyethanol, etc.; or solutions thereof in organic solvents, such as toluene, naphtha, or alcohols, may be made and used as such or as emulsions in water for the impregnation of fibers, yarns, or fabrics or for the coating of surfaces to be protected against the growth of fungi. Fungicidal compositions comprising the pentahalophenyl oxyalkanols are readily applied and are highly effective in controlling the growth of microorganisms. The alkanols having one to three ether groups are particularly effective for the purpose and are not to a substantial extent leached by water from surfaces to which they have been applied. Pentachloro- or pentabromo-phenoxyethanol and phenoxypropanol are almost proof against leaching, while the corresponding pentahalophenoxyalkoxyalkoxy alkanols are slightly sensitive to leaching but yet remain highly effective under adverse conditions in which leaching may occur.

A solution of one part of pentachlorophenoxyethanol was made in 50 parts of denatured (2B) ethyl alcohol and diluted with 50 parts of water. There were padded through this solution pieces of an unbleached Osnaburg fabric and pieces of bleached muslin. The pieces of cloth thus impregnated were passed between rollers to leave about 100% takeup of solution and then air-dried. Samples of the treated fabrics were tested by conventional procedures for their resistance to the growth of typical molds, such as *Metarrhizium sp.* and *Chaetomium globosum*.

According to such procedures, strips of fabric are sterilized and placed in a tube with sterile agar containing nutrient salts. The agar is then inoculated with a suspension of the spores of a selected fungus. The tube is closed with a cotton plug and placed in an incubator for a week. The growth or lack of growth is then noted and the effect on the fabric, if any, determined and compared against control tests. Strips are leached in running tap water for twenty-four hours and subjected to the same testing procedure.

Strips impregnated with the alcoholic solution of pentachlorophenoxyethanol, subjected to the above-described test, supported no growth of Metarrhizium or Chaetomium and retained their tensile strength, whether unleached or leached.

Similar tests with similar results were made with other pentahalophenoxyalkanols, which were dissolved in alcohol and applied from aqueous alcoholic solutions. Results with pentachlorophenoxypropanol-2 were highly satisfactory on unbleached cloth. Results with pentachlorophenoxyethoxyethanol established that this compound prevented the growth of Metarrhizium on bleached or unbleached cloth with retention of tensile strength. Substitution of bromine for chlorine in the phenyl group gives the same results.

The high degree of activity of the compounds of this invention in protecting cellulose fabric against fungi such as are believed to cause mildewing is an outstanding characteristic. One advantage of these compounds is their resistance to leaching. Another is their non-irritation to the human skin.

The alcohols of this invention are also effective as parasiticides, since they are not only effective against fungi but also against insects. They may be used to combat infestations of insects on living plants. For this purpose, they may be taken up on or dispersed with finely divided solids, such as magnesium carbonate, talc, clay, or walnut shell flour, or they may be extended with an inert organic solvent, such as pine oil, together with an emulsifier, such as a petroleum sulfonate. The preparations with finely divided solids may be applied in the form of dusts or in aqueous sprays. The preparations extended with organic solvents are intended for use in sprays.

As illustrative of the effectiveness of the pentachlorophenyl ether alcohols of this invention, there may be mentioned the tests with pentachlorophenoxy ethanol. This compound (one part) was mixed with magnesium carbonate (two parts) and a small amount of a spreader from soya protein and applied in a spray at 1 to 100 to bean plants infested with Mexican bean beetle larvae. Excellent control was obtained.

I claim:

1. A pentahalophenyl derivative of the formula

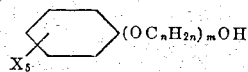

wherein X is a halogen selected from bromine and chlorine, $n$ is an integer from two to three, inclusive, and $m$ is an integer from one to three, inclusive.

2. A compound of the formula

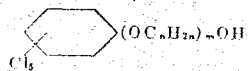

wherein $n$ is an integer from two to three, inclusive, and $m$ is an integer from one to three, inclusive.

3. A compound of the formula

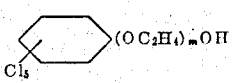

wherein $m$ is an integer from one to three, inclusive.

4. A compound of the formula

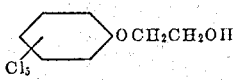

5. A compound of the formula

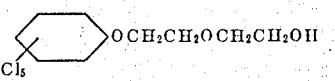

6. A compound of the formula

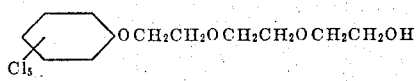

CLINTON W. MacMULLEN.

REFERENCES CITED

The following references are of record in the file of this patent:

UNITED STATES PATENTS

| Number | Name | Date |
|---|---|---|
| 2,205,393 | Coleman (1) | June 25, 1940 |
| 2,130,526 | Coleman (2) | Sept. 20, 1938 |
| 2,186,367 | Coleman (3) | Jan. 9, 1940 |

OTHER REFERENCES

Jrnl. Chem. Soc. (London), vol. 105, pp. 2132, 2186. (Copy in Pat. Off. Lib.)

Bull. Soc. Chim. France (4), 7, pp. 777–779. (Copy in Pat. Off. Lib.)

Chem. Abst., vol. 32, page 5531, Abst. of article by Carswell et al., in Ind. Eng. Chem. 30, 622–6. (1938). Copy of Chem. Abst. in Div. 6, copy of Ind. Eng. Chem. in Pat. Off. Lib.)